Figure 1:
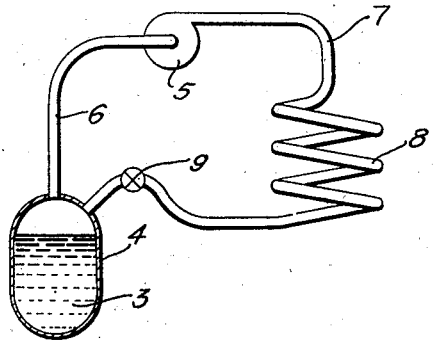

Jan. 8, 1935.   R. W. DAVENPORT   1,986,959
REFRIGERANT COMPOSITION
Filed Feb. 6, 1931

INVENTOR.
Ransom W. Davenport
BY
Ira L. Nickerson
ATTORNEY.

Patented Jan. 8, 1935

1,986,959

UNITED STATES PATENT OFFICE 1,986,959

REFRIGERANT COMPOSITION

Ransom W. Davenport, Detroit, Mich., assignor to Chicago Pneumatic Tool Company, New York, N. Y., a corporation of New Jersey Application February 6, 1931, Serial No. 513,876

2 Claims. (Cl. 252—5)

This invention relates to the transferring of heat and involves both process and working substance aspects.

Among the objects are to provide improved working substances of relatively high boiling point and methods of employing such substances to produce refrigeration at relatively low temperatures but with improved efficiency.

I have previously made disclosures of systems of refrigeration employing a working medium comprising a liquid of relatively high boiling point and an insoluble gas, which medium is expanded in contact with the liquid variously to improve the efficiency of the evaporative step of the refrigeration process. I have heretofore referred to such a process as involving the "vapor-gas principle", the operation of which is set forth in Patent No. 1,619,196 issued to me on March 1, 1927. Other engineers and inventors have disclosed various refrigerants composed of mixtures and solutions of two or more components, of which refrigerants Pictet's fluid serves as a typical example, but none known by me are liquid at room temperature and pressure.

The present invention involves the use of a soluble gas or vapor, instead of an insoluble gas as disclosed in my aforesaid patent, and it includes the discovery of a type of working substance adapted for such use. My invention in principle consists in the discovery of a refrigerant which is liquid at room temperature and pressure comprising a solution of fluids, one of which must be a liquid at ordinary temperatures and pressures and the other a vapor or gas at such temperatures and pressures. The vapor or gas is released from the liquid solution during the evaporating step of the refrigerating process and compressed back into the liquid solution during the condensing step. The system may operate either on the conventional straight pumping cycle or in accordance with the vapor-gas principle. In either case the vapor or gas ingredient is released from the solution in the evaporator and forced back into solution with the liquid in the condenser.

A considerable range of components are available for the solution, especially as to the gas or vapor component. The liquids most suitable for use are methylene chloride $CH_2Cl_2$, boiling point 108° F. and carbon tetrachloride $CCl_4$, boiling point 170° F. The gas or vapor ingredients may be ethyl chloride $C_2H_5Cl$, boiling point 55° F., methyl chloride $CH_3Cl$, boiling point $-10°$ F., also certain hydrocarbon derivatives such as propane, boiling point $-38°$ F., butane, boiling point 12° F. In general, as the boiling points of the components approach each other the proportions of the vapor ingredients should be increased up to the point where the total pressure approaches one atmosphere at room temperature. The preferred solutions substantially in the ratio of one part of the vapor or gas component to three parts of the liquid component are as follows: ethyl chloride and methylene chloride, methyl chloride and carbon tetrachloride, butane and methylene chloride, propane and carbon tetrachloride. Other high boiling components may be chosen for some specific reason apart from the principle ones set forth above.

In carrying out the invention suitable apparatus must be provided for producing the change of state in the working substance. While the improved working substances may be used with good effect in straight pumping systems, still better results are secured with them when operating under the vapor-gas principle due to the greater efficiency of the latter. When vapor expansion into a body of the evaporating liquid is effected as taught by the vapor-gas principle, a thermodynamic cycle is performed on the working substance consisting in alternately liquefying and evaporating the liquid while alternately expanding the soluble gas into the evaporating liquid and compressing it into the liquefying liquid.

Figure 2:
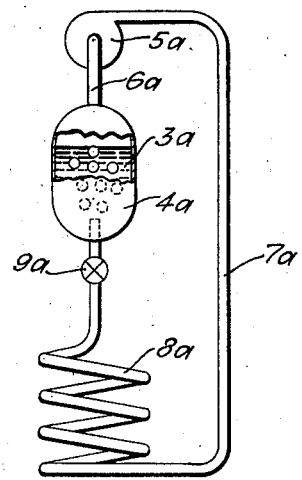

In order to illustrate the invention and the manner of its operation, diagrammatic disclosures of both the straight pumping and the vapor-gas cycles are shown on the accompanying drawing, in which:

Fig. 1 is a diagrammatic view of the conventional straight pumping cycle, the evaporator being shown in section; and Fig. 2 is a somewhat similar diagrammatic illustration of the vapor-gas principle.

In Fig. 1 a body 3 of the liquid solution comprising my improved refrigerant, for example 75% methylene chloride and 25% ethyl chloride, is disposed in an evaporator 4 and subjected to reduced pressure through the action of a pump 5 connected to the top of evaporator 4 by a pipe 6. The refrigerant vapor drawn off by the pump will comprise the greater portion of the ethyl chloride which is available in body 3 on account of its greater volatility and a smaller proportional part of the methylene chloride. The vapors under higher temperature and pressure from the pumping operation are discharged by pump 5 into pipe 7 which leads into a condenser 8 where heat is extracted and the vapors are liquefied. The methylene chloride vapor is first to liquefy and the ethyl chloride is forced back into solution at somewhat increased pressure and lower temperature. The working substance is then returned to the body 3 in evaporator 4 in liquid form through a suitable float valve or other equivalent feeding device 9.

The illustration of the vapor-gas principle in Fig. 2 conforms to that of my aforesaid patent and is similar to the cycle described in the preceding paragraph except that a portion of the residual vapor in the condenser is forced to expand or bubble up through the body of liquid in the evaporator. As indicated in Fig. 2 evaporation of the body 3a of refrigerant, which may be methylene chloride and ethyl chloride in the ratio 3:1 as before, is induced by pump 5a acting through pipe 6a. The discharge of the pump is conducted by pipe 7a to condenser 8a whence leads a conduit having a feeding or expansion device 9a capable of passing both the liquid and gaseous products of the condenser in contiguity and discharging the same beneath the refrigerant body 3a. In this instance the vaporized refrigerant is not retained in the condenser until completely liquefied, as in Fig. 1, but a residual portion of it, which will be largely ethyl chloride on account of its greater volatility, will be expanded into the body of liquid in the evaporator before or while it is at the point of being compressed into the already liquefied methylene chloride in condenser 8a.

No attempt has been made in the drawing to disclose specific apparatus for utilizing the improved refrigerant. As a matter of fact any suitable or desired types and forms of apparatus may be used. The drawing is diagrammatic and merely for the purpose of illustration.

The preferred working substances, namely ethyl chloride and methylene chloride in solution in a 1:3 or less ratio, also methyl chloride and carbon tetrachloride in solution in the same ratio are stable and non-inflammable liquids at room temperature and pressure. The hydro-carbon solutions of butane and methylene chloride and of propane and carbon tetrachloride in the 1:3 ratio are also stable and only slightly flammable. They are readily made non-flammable by a modification of the ratio.

While the invention has been herein disclosed both in its process and working substance aspects in what are now considered to be preferred forms, it is to be understood that the invention is not confined to the specific features, components, and proportions but covers all modifications, adaptations, and relations within the scope of the appended claims.

I claim as my invention:

1. A refrigerant comprising a solution of methylene chloride with a substantial quantity of ethyl chloride, the solution having a total pressure of less than one atmosphere at room temperatures, such refrigerant being suitable for use in a refrigerating system of the closed cycle type comprising a compressor, condenser and evaporator.

2. A refrigerant comprising a solution of methylene chloride and ethyl chloride, the ethyl chloride constituting a substantial portion of but no greater than twenty-five per cent of such solution, the solution having a total pressure of less than one atmosphere at room temperatures, such refrigerant being suitable for use in a refrigerating system of the closed cycle type comprising a compressor, condenser and evaporator.

RANSOM W. DAVENPORT.